United States Patent [19]
Takeda

[11] Patent Number: 5,708,071
[45] Date of Patent: Jan. 13, 1998

[54] AQUEOUS DISPERSION OF AN AMPHOTERIC WATER-SOLUBLE POLYMER, A METHOD OF MANUFACTURING THE SAME, AND A TREATING AGENT COMPRISING THE SAME

[75] Inventor: Hisao Takeda, Zama, Japan

[73] Assignee: Hymo Corporation, Tokyo, Japan

[21] Appl. No.: 571,070

[22] Filed: Dec. 12, 1995

[30] Foreign Application Priority Data

Dec. 15, 1994 [JP] Japan ................... 6-332908

[51] Int. Cl.$^6$ ........................... C08F 2/16
[52] U.S. Cl. ............... 524/458; 524/460; 210/735
[58] Field of Search ................... 524/458, 460, 524/815; 210/735

[56] References Cited

U.S. PATENT DOCUMENTS 4,721,574 1/1988 McGrow .
4,929,655 5/1990 Takeda et al. ................ 524/458

FOREIGN PATENT DOCUMENTS 0163108 12/1985 European Pat. Off. .
0548960 6/1993 European Pat. Off. .

*Primary Examiner*—Jeffrey T. Smith
*Attorney, Agent, or Firm*—Ostrolenk, Faber, Gerb & Soffen, LLP

[57] ABSTRACT

A storage stable, flowable aqueous dispersion of an amphoteric water-soluble polymer with good handling as well as a method of manufacturing the same are provided. Such an aqueous dispersion can be effectively used for flocculating and/or dehydrating sludge, or for separating and treating oil-containing industrial waste water, as a drainage aid, a retention aid, or recovering substances from white water in the papermaking process. The aqueous dispersion of an amphoteric water-soluble polymer is obtained by polymerizing a mixture of monomers comprising a specific cationic monomer and an anionic monomer as essential components wish stirring in an aqueous salt solution incapable of dissolving the produced polymer and in the presence of a polymer electrolyte dispersant soluble in said aqueous salt solution. Such an aqueous dispersion is highly effective when the concentration of the produced amphoteric water soluble polymer in the aqueous dispersion, the concentration of the salt, the concentration of the dispersant, the viscosity of the aqueous dispersion, and the average diameter of the particles of the amphoteric water-soluble polymer in the aqueous dispersion are found within specific ranges.

20 Claims, No Drawings

AQUEOUS DISPERSION OF AN AMPHOTERIC WATER-SOLUBLE POLYMER, A METHOD OF MANUFACTURING THE SAME, AND A TREATING AGENT COMPRISING THE SAME

BACKGROUND OF THE INVENTION

1. Field of the Invention

This invention relates to an aqueous dispersion of an amphoteric water-soluble polymer and a method of manufacturing the same as well as a treating agent comprising the same and, more particularly, it relates to a stably storable and easily flowable aqueous dispersion of an amphoteric water-soluble polymer that can be used as a treating agent such as a chemical to be added to raw sludge, excess sludge, digested eludes or any mixtures thereof derived from municipal sewage, human waste or general industrial waste water in the process of flocculating such sludges, as a chemical to be added to such sludges for flocculating and/or dehydrating such sludges before processing at a decanter, belt press, filter press or screw press dehydrators, as an oil separating agent to be used in an oil separating process for separating and treating oil from oil-containing industrial waste water, as a drainage aid to be used in a papermaking process, as a retention aid to be used in a papermaking process, and as a chemical for recovering useful and valuable substances from white water in the papermaking process and a method of manufacturing the same as well as a treating agent comprising the same.

2. Background Art

Conventionally, a cationic polymer flocculating end/or dehydrating agent is used to flocculate and/or dehydrate few sludge, excess sludge, digested sludge and any mixtures thereof derived from municipal sewage, human waste or general industrial waste water. However, as a result of a rise in the amount of sludge generation and the worse quality of the generated sludge in recent years, any known cationic polymer flocculating and/or dehydrating agent cannot effectively treat sludge if used alone. Additionally, the water content of dehydrated cake, the collectible ratio of suspended solids (hereinafter referred to as SS) and the exfoliativity of the cake from the filter cloth are currently not satisfactory and require improvement.

A number of proposals have been made to improve existing cationic polymer flocculating agents.

For instance, there have been proposed a copolymer containing as essential components acryloyloxyethyldimethylammonium salt and acryloyloxyethyldimethylbenzylammonium salt (Japanese Patent Application Laid-Open No. 62-262799), an amphoteric water-soluble copolymer of a cationic monomer having a tertiary or quaternary amino group and acrylic acid (Japanese Patent Application Laid-Open No. 56-118798), an amphoteric copolymer of a cationic monomer having a tertiary amino group, a cationic monomer having a quaternary amino group and (math) acrylic acid (Japanese Patent Application Laid-Open No. 3-189000) and an emphoteric copolymer of an acrylate monomer having an amino group, a methacrylate monomer having an amino group and acrylic acid (Japanese Patent Application Laid-Open No. 3-293100).

Of these proposals, those for amphoteric polymers are attracting attention because they perform excellently in terms of flocculating effect.

Cationic water-soluble polymers are used as oil separating agents for the oil manufacturing process and the process of separating oil from oil-containing industrial waste water and treating it. Cationic water-soluble polymers are also used as drainage side, retention aids and chemicals for recovering valuable substances from white water in the papermaking process.

Known conventional methods for manufacturing a cationic water-soluble polymer to be used as a flocculating agent for the above intermediary processes and the waste water treatment process, as an oil separating agent or a chemical agent for the papermaking process include stationary polymerization in an aqueous solution, emulsion polymerization of a water-in-oil type (Japanese Patent Application Laid-Open No. 54-102388) and suspension polymerization in a hydrophobic solvent (Japanese Patent Application Laid-Open No. 54-69196).

As a method of manufacturing a nonionic or an anionic water-soluble polymer, precipitation polymerization in an aqueous solution of ammonium sulfate is described in a patent document (Japanese Patent Application Laid-Open No. 50-70489).

However, with stationary polymerization in an aqueous solution, the process of polymerization has to be conducted with a monomer concentration of 10 wt % or more in order to obtain a polymer having a large molecular weight and the polymerization product is in the form of water-containing gel, which is hardly soluble by itself so that it should be either diluted to a low concentration solution of 5 wt % or less to increase the flowability or dried and powdered before it is marketed.

On the other hand, the polymerization product entails high transportation cost if it Is marketed as a low concentration solution and consumes thermal energy at an enormous rate for drying if it is powdered. Additionally, three-dimensional cross-linking can take place to produce an water-insoluble portion in it if it is heated.

With emulsion polymerization of the water-in-oil type, the resulting product can become highly inflammable and the costly organic solvent is consumed.

With suspension polymerization in a hydrophobic solvent on the other hand, a tremendous cost needs to be invested for the manufacturing facility because it involves the use of highly inflammable substances such as cyclohexane, toluene, and so on.

While precipitation polymerization in an aqueous solution of ammonium sulfate is advantageous in terms of the low cost of the manufacturing facility, it is disadvantageous in that the produced polymer can agglomerate to a large mass that provides a handling problem.

In an attempt to overcome the above drawbacks, there has been proposed a method of manufacturing an easily flowable aqueous dispersion of a cationic polymer obtained by polymerizing a cationic monomer with stirring in an aqueous salt solution incapable of dissolving the produced polymer and in the presence of a polymer electrolyte dispersant soluble in said aqueous salt solution (Japanese Patent Application Laid-Open No. 61-123610).

However, the disclosed technology is applicable only to an aqueous dispersion of a cationic polymer and no such technology that is applicable to an aqueous dispersion of an amphoteric water-soluble polymer has been known to date.

It is therefore an object of the present invention to provide a stably storable and easily flowable aqueous dispersion of an amphoteric water-soluble polymer that can be used as a treating agent such as a chemical to be added to raw sludge, excess sludge, digested sludge or any mixtures thereof derived from municipal sewage, human waste or general industrial waste water in the process of flocculating such sludges, as a chemical to be added to such sludges for flocculating end/or dehydrating them before processing at a decanter, belt press, filter press or screw press dehydrators, as an oil separating agent to be used in an oil separating process for separating and treating oil from oil-containing industrial waste water, as a drainage aid to be used in a papermaking process, as a retention aid to be used in a papermaking process and as a chemical to be used for recovering valuable substances from white water in the papermaking process and a method of manufacturing the same as well as a treating agent comprising the same.

SUMMARY OF THE INVENTION

As a result of intensive research efforts, the inventor of the present invention found that an aqueous dispersion obtained by polymerizing a mixture of monomers comprising a specific cationic monomer and an anionic monomer as essential components with stirring in an aqueous salt solution incapable of dissolving the produced polymer and in the presence of a polymer electrolyte dispersant soluble in said aqueous salt solution is stably storable, easily flowable and good for handling when the concentration of the produced amphoteric water-soluble polymer in the aqueous dispersion, the concentration of the salt, the concentration of the dispersant, the viscosity of the aqueous dispersion, and the average diameter of the particles of the amphoteric water-soluble polymer in the aqueous dispersion are respectively found within specific ranges. The inventor also found that such an aqueous dispersion can be easily manufactured by means of a known apparatus.

More specifically, according to a first aspect of the invention, there is provided a stably storable and easily flowable aqueous dispersion of an amphoteric water-soluble polymer obtained by polymerizing a mixture of monomers comprising a cationic monomer expressed by the following general formula

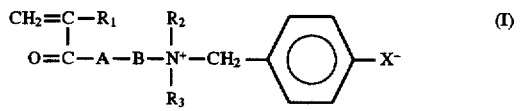

, where A is O or NH; B is an alkyl group of 2–3 carbon atoms; $R_1$ is H or $CH_3$; $R_2$ and $R_3$ are each an alkyl group of 1–2 carbon atoms; $X^-$ is an anionic counter ion, and an anionic monomer as essential components with stirring in an aqueous salt solution incapable of dissolving the produced polymer and in the presence of a polymer electrolyte dispersant soluble in said aqueous salt solution, said aqueous dispersion having characteristic properties which are that (1) the concentration of the amphoteric water-soluble polymer in the aqueous dispersion is 5 wt % or more, that (2) the average particle diameter of the particles of the amphoteric water-soluble polymer in the aqueous dispersion is 0.1–150 μm, that (3) the viscosity of the aqueous dispersion is 10–3000 cp, that (4) the concentration of the salt in the aqueous dispersion is 15 wt %-saturation concentration, and that (5) the concentration of the dispersant in the aqueous dispersion based on the amphoteric water-soluble polymer is 1–15 wt %.

According to a second aspect of the invention, there is provided a method of manufacturing a stably storable and easily flowable aqueous dispersion of an amphoteric water-soluble polymer, characterized in polymerizing a mixture of monomers comprising a cationic monomer expressed by the general formula (I) shown above and an anionic monomer as essential components with stirring in an aqueous salt solution incapable of dissolving the produced polymer and in the presence of a polymer electrolyte dispersant soluble in said aqueous salt solution.

According to a third aspect of the invention, there are provided a flocculating and/or dehydrating agent, an oil separating agent, a drainage aid, a retention aid and a chemical for recovering valuable substances from white water.

DETAILED DESCRIPTION OF THE PREFERRED EMBODIMENT

An aqueous dispersion according to the invention contains an amphoteric water-soluble polymer at a high concentration equal to or higher than 5wt %, normally at a level between 5 wt % and 40 wt %. An aqueous dispersion of an amphoteric water-soluble polymer according to the invention contains said salt and said dispersant at respective specific ratios.

While an aqueous dispersion according to the invention contains an amphoteric water-soluble polymer at a high concentration, its viscosity is normally as low as 10–3000 cp because the amphoteric water-soluble polymer is stably dispersed in the dispersion medium in the form of fine particles. Thus, it is easily flowable and has a characteristic feature of easy handling.

The average particle diameter of the particles of the amphoteric water-soluble polymer in an aqueous dispersion according to the invention is normally 0.1–150μm, preferably 0.1–50 μm end more preferably 0.1–30 μm. If the average particle diameter of the particles of the amphoteric water-soluble polymer exceeds 150 μm, they can easily precipitate to damage the stable storability of the dispersion and require a long time before they are completely dissolved into water because of the large sizes of the particles of the amphoteric water-soluble polymer if aqueous dispersion is mixed with water for use.

To the contrary, an aqueous dispersion according to the invention is stably storable and is free from the problem of agglomerating to a large mass even if stored at room temperature. Additionally, it is highly soluble to water for actual use.

There are no specific limitations to the molecular weight of the amphoteric water-soluble polymer in an aqueous dispersion according to the invention. However, it preferably has a large molecular weight in view of the applications including a chemical to be added to raw sludge, excess sludge, digested sludge or any mixtures thereof derived from municipal sewage, human waste or general industrial waste water in the process of flocculating such sludges, a chemical to be added to such sludges for flocculating and/or dehydrating them before processing at to a decanter, belt press, filter press or screw press dehydrators, and a chemical in a papermaking process. When an aqueous dispersion according to the invention is dissolved in a 2 wt % aqueous solution of ammonium sulfate to produce a concentration of 0.5 wt % of the amphoteric water-soluble polymer, the viscosity of the produced solution (when measured with a Brookfield type viscometer at 25° C.) is normally found within a range of 10–200 cp.

For the purpose of the present invention, one or more than one cationic monomers expressed by the general formula (I) shown above ore used as an essential component.

Typical examples of cationic monomers expressed by the general formula (I) above include acryloyloxyethyldimethylbenzylammonium chloride, methacryloyloxyethyldimethylbenzylammonium chloride, acrylamidepropyldimethylbenzylammonium chloride and methacrylamidepropyldimethylbenzylammonium chloride.

For the purpose of the present invention, a cationic monomer expressed by the general formula (I) above and a cationic monomer expressed by the general formula (II),

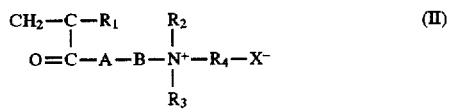

, wherein A is O or NH; B is an alkyl group of 2–3 carbon atoms; $R_1$ is H or $CH_3$; $R_2$ and $R_3$ are each an alkyl group of 1–2 carbon atoms; $R_4$ is an alkyl group of 1–2 carbon atoms; $X^-$ is an anionic counter ion, may be copolymerized.

Typical examples of cationic monomers expressed by the general formula (II) above include (meth)acryloyloxyethyltrimethylammonium chloride, (meth)acrylaminopropyltrimethylammonium chloride, dimethylaminoethyl(meth)octylate chloride or sulfate and dimethylaminopropyl(meth)acrylamide chloride or sulfate.

For the purpose of the present invention, an anionic monomer is used as an essential component with a cationic monomer as defined above. Examples of anionic monomers include itaconic acid and (meth)acrylic anionic monomers.

Typical examples of (meth)acrylic anionic monomers include (meth)acrylic acid, 2-acrylamide-2-methylpropane sulfonic acid, and so on.

For the purpose of the present invention, a mixture of ionic monomers as described above and (meth)acrylamide may be copolymerized.

However, in order to make the amphoteric water-soluble polymer remarkably show its characteristic features, the total mole % of ionic monomers including cationic and anionic monomers contained in the copolymer is preferably 5 mole % or more, and mole preferably 10 mole % or more. If the total content of ionic monomers in the copolymer is less than 5 mole %, the copolymer performs poorly for flocculation, hydration end of other functions.

As for the mole ratio of each ionic monomer, the total gram equivalent of cationic monomer(s) contained in the amphoteric copolymer is preferably greater than that of anionic monomer(s) contained therein because it is preferably that the copolymer contains more cationic groups than anionic groups.

In the present invention, monomers to be polymerized may be preferably dissolved in the aqueous salt solution. However, in addition to the above described monomers, hydrophobic monomers such as acrylonitrile, methylacrylate, ethylacrylate, 2-ethylhexylacrylate and styrene can be used for copolymerization if the produced copolymer is water-soluble, For the purpose of the present invention, the process of polymerization is conducted with stirring a mixture of monomers in an aqueous salt solution and in the presence of a diapersant. The concentration of the monomers is preferably 5 wt % or more, more preferably 10 wt % or more and most preferably 15–40 wt %. If the concentration of the monomers is less than 5 wt %, the concentration of the polymer in the aqueous dispersion becomes disadvantageously low.

For the purpose of the present invention, it is an essential requirement that the aqueous salt solution operating as a polymerization solvent and also as a dispersion medium does not dissolve the polymerization product or it salts out the polymerization product.

For the purpose of the present invention, an optimum combination of the contents of the monomers of the amphoteric water-soluble polymer and the type and the concentration of the salt is essential. In other words, a combination with which the amphoteric water-soluble polymer is salted our to produce an aqueous dispersion is found within the scope of the present invention.

Examples of salts that can be used for the purpose of the present invention include polyvalent anionic salts such as sodium sulfate, ammonium sulfate, magnesium sulfate, aluminum sulfate and sodium dihydrogen phosphate, although other salts that do not dissolve the polymerization product can also be used.

The concentration of the salt in the reaction solution during the polymerization process can vary depending on the mole ratio of each cationic monomer expressed by the general formulae (I) or (II) or anionic monomer and the type of the salt used in the process and, therefore, is not subject to specific limitations.

However, the concentration of the salt in the reaction solution during the polymerization process is preferably between 15wt % based on the weight of the polymerization medium (which is defined as the weight of the reaction mixture minus the weight of monomers) and the saturated concentration, more preferably between 15 wt % end 30 wt %, and most preferably between 15 wt % and 25 wt %. If the concentration of the salt is lower than 15 wt %, the viscosity of the reaction mixture becomes too high and makes it difficult to successfully complete the polymerization process.

For the purpose of the present invention, although a salt is added to the solvent for polymerization at a time before the polymerization process, a part of the salt may alternatively be added to the produced aqueous dispersion after the completion of the polymerization process. The viscosity of the aqueous dispersion con become lower when part of the salt is added to the aqueous dispersion after the completion of the polymerization process than that when all the salt is added to the solvent for polymerization at a time before the polymerization process. The concentration of the salt based on the weight of the final aqueous dispersion after adding a part of it to the aqueous dispersion after the completion of the polymerization process is preferably between 15 wt % and the saturated concentration and more preferably 15–25wt %.

Any combination of the components of the monomers of the amphoteric water-soluble polymer and the type and the concentration of the salt that does not cause the polymerization product to be salted out is out of the scope of the present invention.

For the purpose of the present invention, it is an essential requirement that the polymer electrolyte dispersant present in the polymerization process is soluble in the aqueous salt solution.

A cationic polymer electrolyte is preferably used for the polymer electrolyte dispersant because the total gram equivalent of cationic monomer(s) contained in the amphoteric copolymer is preferably greater than that of anionic monomer(s) contained therein.

Examples of cationic polymer electrolytes that can be used for the purpose of the present invention include a homopolymer or a copolymer of one or more than one monomers selected from cationic monomers including dimethylaminoethyl(meth)acrylate chloride or sulfate, dimethylaminopropyl(meth)acrylamide chloride or sulfate, (meth)acryloyloxyethyltrimethylammonium chloride, (meth)acrylamidepropyltrimethylammonium chloride and dimethyldiarylammonium chloride in a mole ratio of 50 mole % to 100 mole %, and acrylamide in a mole ratio of 50 mole % to 0 mole %.

The amount of the polymer electrolyte dispersant is about 1–15 wt % and preferably 1–10 wt % based on the total weight of monomer(s). If the amount is less than 1 wt %, the polymerization product cannot be obtained in a dispersed state and undesirably agglomerates to a large mass. If the amount exceeds 18 wt %, the viscosity of the finally obtained aqueous dispersion is undesirably too high to lose an easy flowability.

For the purpose of the present invention, there are not specific limitations to the polymerization temperature so far as the polymerization initiator works properly at the selected temperature. Also, there are no limitations to the selection of a polymerization initiator and it may be selected from those of the redox type, those of the azo type and those of any other types.

Applications of the aqueous dispersion of the present invention include a chemical to be added to raw sludge, excess sludge, digested sludge or any mixtures thereof derived item municipal sewage, human waste or general industrial waste water in the process of flocculating such sludges, a chemical to be added to such sludges for flocculating and/or dehydrating them before processing at to a decanter, belt press, filter press or screw press dehydrators, an oil separating agent to be used in an oil separating process for separating and treating oil from oil-containing industrial waste water, a drainage aid to be used in a papermaking process, a retention aid to be used in a penetrating process, and a chemical to be used for recovering valuable substances from white water in the papermaking process.

Since an aqueous dispersion of an amphoteric water-soluble polymer according to the invention is a copolymer comprising a cationic monomer expressed by the general formula (I) shown above and an appropriate anionic monomer within each molecule, it shows an excellent flocculating effect if compared with conventional cationic and amphoteric water-soluble polymers because of the particular synergetic effects of the polymer. It also shows a strong affinity to oils.

Usually, any of such general cationic or amphoteric water-soluble polymers is dissolved and diluted in an aqueous solution to a predetermined low concentration (polymer concentration: about 0.2%) before use. Since an aqueous dispersion according to the invention contains fine particles of a polymer having a small diameter and hence has a low viscosity, an excellent flowability and a high dissolution speed, it con effectively be used for automatically dissolving systems of a variety of industrial facilities. Additionally, since an aqueous dispersion of a polymer according to the invention has an excellent solubility, it can be directly added to waste water, sludge and papermaking processes.

When an aqueous dispersion according to the invention is used for waste water treatment or for oil separation, the dosage is usually 0.1–2% based on the solid content of waste water or the oil content. When it is used as an additive in a papermaking process, the dosage is usually 0.001–0.1% based on the total pulp weight.

An aqueous dispersion according to the invention is stably storage, easily flowable end good for handling when the concentration of the produced amphoteric water-soluble polymer in the aqueous dispersion, the concentration of the salt, the concentration of the dispersant, the viscosity of the aqueous dispersion, and the average diameter of the particles of the amphoteric water-soluble polymer in the aqueous dispersion are respectively found within specific ranges.

An aqueous dispersion according to the invention can be easily manufactured by polymerizing a mixture of monomers including a cationic monomer expressed by the general formula (I) shown above and an anionic monomer with stirring in an aqueous salt solution and in the presence of polymer electrolyte diapersant by means of a known apparatus.

For the purpose of the present invention, an aqueous salt solution is used an order to prevent the polymerization product from being dissolved and salt it out. While the operating mechanism of a polymer electrolyte dispersant employed for the purpose of the present invention is sufficiently clear yet, it may operate as protective colloid that prevent particles of the polymerization product from adhering to each other.

A cationic monomer expressed by the general formula (I) above has a strongly hydrophobia benzyl group bonded to an amine group so that, it may be assumed, consequently the obtained polymerization product is hardly soluble in an aqueous salt solution, although it is a water-soluble polymer.

If an aqueous dispersion of an amphoteric water-soluble polymer according to the invention is used as a flocculating and dehydrating agent, it shows en excellent flocculating effect due to the particular synergetic effects of the polymer when compared with general cationic and amphoteric water-soluble polymers because it is a copolymer comprising a cationic monomer expressed by the general formula (I) shown above and an appropriate anionic monomer within each molecule. It also shows a strong affinity to oils.

Since an aqueous dispersion according to the invention shows an excellent solubility compared with any existing conventional cationic or amphoteric water-soluble polymers, it can be added directly to waste water, sludge and papermaking processes as a flocculating and dehydrating agent, as an oil separating agent, as a drainage aid, as a retention aid and as a chemical to be used for recovering valuable substances from white water of papermaking.

The present invention will be described in greater detail by way of examples hereinafter, although the scope of the present invention is by no means limited by the following examples.

Example 1

4.2 g of a homopolymer of acryloyloxyethyltrimethylammonium chloride as a dispersant and 84.0 g of sodium sulfate were dissolved in 303.2 g of ion-exchanged water in a 1-liter five-necked separable flask equipped with a stirrer, a thermometer, a reflux condenser and a nitrogen inlet. 49.79 g (85 mole %) of acrylamide, 27.8 g of 80% aqueous solution of acryloyloxyethyldimethylbenzylammonium chloride (monomer content 22.24 g 10 mole %) and 2.97 g (5 mole %) of acrylic acid were added thereto, followed by heating them to 50° C. and the air inside was displaced with nitrogen. 2.0 g of 1% aqueous solution of 2,2'-azobis(2-amidinopropane)chloride was further added thereto as a polymerization initiator and the polymerizing operation was conducted with stirring at 50° C. for 10 hours to obtain a polymer in the form of fine particles dispersed in the aqueous salt solution.

The viscosity of the aqueous dispersion fell to a final viscosity of 110 cp when 26 g of sodium sulfate was added to the reaction mixture.

When the reaction product was dissolved into 2% aqueous solution of ammonium sulfate to obtain 0.5% solution of the polymer, the obtained solution showed a viscosity of 56 cp (hereinafter so-called "0.5% aqueous salt solution viscosity").

Further, all the viscosity measurements shown in this specification were carried out at 25° C. by means of a Brookfield viscometer.

When the final aqueous dispersion was viewed through an optical microscope, independent fine particles having an average particle diameter of 5 μm were observed. After having been hermetically sealed and stored at room temperature for a month, it was examined again through an optical microscope to find independent fine particles same as those observed immediate after the manufacturing. No mutual adhesion of fine particles was observed. Thus, it was proved that particles of the polymer in the aqueous dispersion would not agglomerate end remain in a dispersed state if the solution is stored for a prolonged period of time.

Table 1 summarizes the conditions of polymerization and the types and amounts of the added salts in the examples.

TABLE 1

| | Amount of Polymerizing Solution (g) | Amount of Monomer (g) | Cationic Monomer Formula (I) Type | Charge (g) | mol (%) | Formula (II) Type | Charge (g) | mol (%) | Cationic Gram Equivalent | Anionic Monomer Type | Charge (g) | mol (%) | Anionic Gram Equivalent |
|---|---|---|---|---|---|---|---|---|---|---|---|---|---|
| Example | | | | | | | | | | | | | |
| 1 | 474 | 75 | DMABC | 22.24 | 10 | — | 0 | 0 | 0.083 | AAc | 2.97 | 5 | 0.041 |
| 2 | 475 | 100 | DMBC | 37.31 | 17 | DMPO | 20.78 | 13 | 0.232 | IA | 7.55 | 7.5 | 0.116 |
| 3 | 475 | 100 | DMPBC | 54.71 | 30 | DMC | 13.40 | 10 | 0.258 | AMPS | 6.68 | 5 | 0.032 |
| 4 | 475 | 100 | DMABC | 52.08 | 30 | DMO | 24.93 | 20 | 0.322 | AAc | 9.28 | 20 | 0.129 |
| 5 | 485 | 125 | DMABC | 75.77 | 40 | DMO | 27.20 | 20 | 0.422 | IA | 4.57 | 5 | 0.070 |
| 6 | 485 | 125 | DMBC | 85.12 | 45 | DMC | 20.77 | 15 | 0.400 | AAc | 12.01 | 25 | 0.167 |
| 7 | 475 | 100 | DMABC | 52.08 | 30 | DMO | 24.93 | 20 | 0.322 | AAc | 9.28 | 20 | 0.129 |
| 8 | 475 | 100 | DMABC | 52.08 | 30 | DMO | 24.93 | 20 | 0.322 | AAc | 9.28 | 20 | 0.258 |
| 9 | 500 | 100 | DMABC | 52.08 | 30 | DMO | 24.93 | 20 | 0.322 | AAc | 9.28 | 20 | 0.129 |
| Comparative Example | | | | | | | | | | | | | |
| 1 | 500 | 100 | — | 0 | 0 | DMO | 73.05 | 50 | 0.378 | AAc | 10.87 | 20 | 0.151 |
| 2 | 500 | 100 | DMABC | 52.08 | 30 | DMO | 24.93 | 20 | 0.322 | AAc | 9.28 | 20 | 0.129 |
| 3 | 500 | 100 | DMABC | 52.08 | 30 | DMO | 24.93 | 20 | 0.322 | AAc | 9.28 | 20 | 0.129 |
| 4 | 500 | 100 | DMABC | 52.08 | 30 | DMO | 24.93 | 20 | 0.322 | AAc | 9.28 | 20 | 0.129 |

| | Other Monomer Type | Charge (g) | mol (%) | Salt Type | Charge (g) | wt % Based On solvent (%) | Dispersant Type | Charge (g) | wt % Based On monomer (%) | ADDITIONAL SALT Type | Amount (g) |
|---|---|---|---|---|---|---|---|---|---|---|---|
| Example | | | | | | | | | | | |
| 1 | AAa | 49.79 | 85 | (1) | 84 | 21.85 | (3) | 4.2 | 5.6 | (1) | 26 |
| 2 | AAa | 34.36 | 62.5 | (2) | 80 | 21.33 | (3) | 5.0 | 5.0 | (2) | 25 |
| 3 | AAa | 25.21 | 55 | (2) | 80 | 21.33 | (4) | 7.0 | 7.0 | (2) | 25 |
| 4 | AAa | 13.72 | 30 | (2) | 80 | 21.33 | (3) | 5.0 | 5.0 | (2) | 25 |
| 5 | AAa | 17.47 | 35 | (2) | 75 | 20.83 | (3) | 5.0 | 4.0 | (2) | 15 |
| 6 | AAa | 7.11 | 15 | (2) | 75 | 20.83 | (3) (5) | 2.5 2.5 | 4.0 | (2) | 15 |
| 7 | AAa | 13.72 | 30 | (2) | 80 | 21.33 | (3) | 10.0 | 10.8 | (2) | 25 |
| 8 | AAa | 13.72 | 30 | (2) | 80 | 21.33 | (3) | 15.0 | 15.0 | (2) | 25 |
| 9 | AAa | 13.72 | 30 | (2) | 105 | 26.25 | (3) | 5.0 | 5.0 | none | — |
| Comparative Example | | | | | | | | | | | |
| 1 | AAa | 16.06 | 30 | (2) | 105 | 26.25 | (3) | 5.0 | 5.0 | none | — |
| 2 | AAa | 13.72 | 30 | (2) | 50 | 12.50 | (3) | 5.0 | 5.0 | none | — |
| 3 | AAa | 13.72 | 30 | (2) | 105 | 26.25 | (3) | 0.5 | 0.5 | none | — |
| 4 | AAa | 13.72 | 30 | (2) | 105 | 26.25 | (3) | 20.0 | 20.0 | none | — |

In Table 1, the abbreviated marks are represented as follows:

DMABC: acryloyloxyethyldimethylbenzylammonium chloride

DMBC: methacryloyloxyethyldimethylbenzylammonium chloride

DMPBC: acrylamidopropyldimethylbenzylammonium chloride

DMPQ: acrylamidepropyltrimethylammonium chloride

DMC: methacryloyloxyethyltrimethylammonium chloride

DMQ: acryloyloxyethyltrimethylammonium chloride
AAm: acrylamide
AAc: acrylic acid
IA: itaconic acid
AMPS: 2-acrylamide-2-methylpropane sulfonic acid
(1) $Na_2SO_4$
(2) $(NH_4)_2SO_4$
(3) p-DMQ: polyacryloyloxyethyltrimethylammonium chloride
(4) p-DMC: polymethacryloyloxyethyltrimethylammonium chloride
(5) p-DMDAC: polydimethyldiarylammonium chloride Table 2 summarizes the amounts and some of the properties of the final aqueous dispersions obtained in the examples.

The aqueous dispersions were tested for solubility in a manner as described below and rated in terms of the time spent for dissolution.

For each test, 200 g of distilled water was put into a 300 ml beaker and stirred with a magnetic stirrer at a rate of 1000 rpm to produce a voluted water flow. The aqueous dispersion was then added to the distilled water by means of a syringe to such an amount that made the concentration of the polymer equal to 0.2% and the time required for the polymer to completely dissolve into the distilled water and become evenly transparent if viewed with eyes wes measured. The times required for complete dissolution are also shown in Table 2.

In each of Examples 2~9 and Comparative Examples 1~4 described below, the weight of the finally obtained aqueous dispersion was 500 g.

Examples 2~6

For each example, an aqueous dispersion was prepared by polymerization by the method same as that of Example 1 except that the conditions listed in Table 1 were used for polymerization. The type and the amount of the salt added to the obtained aqueous dispersion to reduce the viscosity of the solution is also shown in Table 1. Some of the properties of the aqueous dispersions obtained in these examples are also summarized in Table 2.

TABLE 2

| | Properties of Aqueous Dispersion | | | | | | | |
|---|---|---|---|---|---|---|---|---|
| | Weight of Final Dispersion (g) | Total Amount of Salts | | Viscosity of Final Dispersion (op) | 0.5% Aqueous Salt Solution Viscosity (op) | Average Particle Diameter (μm) | Stability | Time for Complete Dissolution (min.) |
| | | Amount (g) | wt % based on Final Dispersion (wt %) | | | | | |
| Example | | | | | | | | |
| 1 | 500 | 110 | 22.0 | 110 | 56 | 5 | No adhesion of particles after 1 month | 20 |
| 2 | 500 | 105 | 21.0 | 230 | 75 | 8 | No adhesion of particles after 1 month | 20 |
| 3 | 500 | 105 | 21.0 | 850 | 71 | 8 | No adhesion of particles after 1 month | 20 |
| 4 | 500 | 105 | 21.0 | 300 | 68 | 15 | No adhesion of particles after 1 month | 20 |
| 5 | 500 | 90 | 18.0 | 450 | 55 | 10 | No adhesion of particles after 1 month | 20 |
| 6 | 500 | 90 | 18.0 | 250 | 45 | 10 | No adhesion of particles after 1 month | 20 |
| 7 | 500 | 105 | 21.0 | 1200 | 63 | 10 | No adhesion of particles after 1 month | 20 |
| 8 | 500 | 105 | 21.0 | 2300 | 86 | 10 | No adhesion of particles after 1 month | 20 |
| 9 | 500 | 105 | 21.0 | 2500 | 86 | 120 | No adhesion of particles after 1 month | 40 |
| Comparative Example | | | | | | | | |
| 1 | 500 | 105 | 21.0 | mass | | | | |
| 2 | 500 | 50 | 10.0 | mass | | | | |
| 3 | 500 | 105 | 21.0 | 150 | 48 | 5000 | particles adhered to each other to form a mass after 1 day | 120 |
| 4 | 500 | 106 | 21.0 | 8600 | 36 | 80 | No adhesion of particles after 1 month | 90 |

Examples 7~8

The monomers and the salt of Example 4 were used for polymerization with the same respective amounts and concentration for each of there examples to produce respective aqueous dispersions except that the amount of the dispersant was increased to 10 g (10% based on the monomers) in Example 7 and to 15 g (15% based on the monomers) in Example 8. The types and the amounts of the salt added to the obtained aqueous dispersion to reduce the viscosity of the solution of each example are also shown in Table 1. Some of the properties of the aqueous dispersions obtained in these examples are also summarized in Table 2.

Example 9

The monomers, the salt and the dispersant of Example 4 were used for polymerization with the same respective amounts and concentrations for this example except that the amount of the salt used at the time of polymerization and that of the salt added to the aqueous dispersion after the polymerizing operation of Example 4 were collectively used at the time of the polymerizing operation to realize a high concentration of the salt for the polymerizing operation in this Example. Table 1 summarizes the conditions of polymerization of this example. Some of the properties of the aqueous dispersion obtained in this example are also summarized in Table 2.

While the final aqueous dispersion showed a certain degree of flowability, its viscosity was 2500 cp or a value higher than that of the aqueous dispersion of Example 4. Thus, it was found that the viscosity of the final aqueous dispersion effectively falls if part of the salt is added after the completion of polymerization. Additionally, since particles in the aqueous dispersion had a relatively large average particle diameter, a longer time was required for complete dissolution.

Comparative Example 1 (for comparison with Example 9)

5.0 g of a homopolymer of acryloyloxyethyltrimethylammonium chloride as a dispersant and 105.0 g of ammonium sulfate were dissolved in 269.74 g of ion-exchanged water in the separable flask of Example 1. 16.08 g (30 mole %) of acrylamide, 91.31 g of 80% aqueous solution of acryloyloxyethyltrimethylammonium chloride (monomer content 73.05 g; 50 mole %) and 10.87 g (20 mole %) of acrylic acid were added thereto, followed by heating them to 50° C. and the air inside was displaced with nitrogen. No monomer corresponding to the general formula (I) was used.

2.0 g of 1% aqueous solution of 2,2'-azobis(2-amidinopropane)chloride was further added thereto as a polymerization initiator and the polymerizing operation was conducted with stirring at 50° C. As the polymerization proceeded, the system increased its viscosity and, after about an hour, it was impossible to stir it any further. Finally, the produced polymer agglomerated to a large mass and no polymer in a dispersed state was obtained. Table 1 summarizes the conditions of polymerization of this example. Some of the results of polymerization are also summarized in Table 2.

Comparative Example 2 (for comparison which Example 9)

5.0g of a homopolymer of acryloyloxyethyltrimethylammonium chloride as a dispersant was dissolved in 323.74 g of ion-exchanged water in the separable flask of Example 1, to which 50 g of ammonium sulfate (12.5% based on the solvent, 10.0% based on the final product), an amount smaller than 105.0 g of Example 9, was added. As in the case of Example 9, 13.72 g (30 mole %) of acrylamide, 65.1 g of 80% aqueous solution of acryloyloxyethyldimethylbenzylammonium chloride (monomer content 52.08 g; 30 mole %), 31.16 g of 80% aqueous solution of acryloyloxyethyltrimethylammonium chloride (monomer content 24.93 g; 20 mole %) and 9.28 (20 mole %) of acrylic acid were added thereto, followed by hosting them to 50° C. and the air inside was displaced with nitrogen. 2.0g of 1% aqueous solution of 2,2'-azobis(2-amidinopropane)chloride was further added thereto as a polymerization initiator and the polymerizing operation wes conducted with stirring at 50° C. As the polymerization proceeded, the system increased its viscosity and, after about an hour, it was impossible to stir it any further. Finally, the produced polymer agglomerated to a large mass and no polymer in a dispersed state was obtained. Table 1 summarizes the conditions of polymerization of this example. Some of the results of polymerization are also summarized in Table 2.

Comparative Example 3 (for comparison with Example 9)

105.0 g of ammonium sulfate was put into a separable flask of Example 1 and 273.24 g of ion-exchanged water was added thereto. 0.5 g of a homopolymer of acryloxyloxyethyltrimethyl ammonium chloride (0.5% based on the monomers), or an amount smaller than 5.0 g of Example 9, was dissolved as a dispersant therein. As in the case of Example 9, 13.72 g (30 mole %) of acrylamide, 65.1 g of 80% aqueous solution of acryloyloxyethyldimethylbenzylammonium chloride (monomer content 52.08 g; 30 mole %). 31.16 g of 80% aqueous solution of acryloyloxyethyltrimethylammonium chloride (monomer content 24.93 g; 20 mole %) and 9.28 g (20 mole %) of acrylic acid were added thereto, followed by heating them to 50° C. and the air inside was displaced with nitrogen. 2.0 of 1% aqueous solution of 2,2'-azobis(2-amidinopropane)chloride was further added thereto as a polymerization initiator and the polymerizing operation was conducted for 10 hours with stirring at 50° C. to produce a precipitate of polymer particles having an average particle diameter of 5 mm (500 μm) in the aqueous salt solution.

When quietly left overnight, the particles of the polymer adhered to each other and could not be dispersed stirred.

Table 1 summarizes the conditions of polymerization of this example. Some of the properties of the product obtained in this example are also summarized in Table 0.5 g of the particulate product having an average particle diameter of 5 mm was dissolved into distilled water and the time required for the polymer to completely dissolve into the distilled water and become evenly transparent if viewed with eyes was measured. The time required for complete dissolution is also shown in Table 2. The particles took 2 hours for dissolution like comparable ordinary powdery products.

Comparative Example 4 (for Comparison with Example 9)

The monomers and the salt of Example 9 were used for polymerization with the same respective amounts and concentration except that the amount of the dispersant was increased to 20 g (20% based on the monomers).

The viscosity of the final aqueous dispersion was as high as 8500 cp and did not practically show any flowability.

Table 1 summarizes the conditions of polymerization of this example. Some of the properties of the product obtained in this example are also summarized in Table 2.

The time required for complete dissolution was measured as in the case of Example 1 and the result is also shown in Table 2. While the average particle diameter of the particles in the aqueous dispersion was relatively small, they dropped in the form of solid masses because of its remarkably high viscosity when tried to be injected into distilled water by means of a syringe. Thus the net result was same as the case of dissolving large particles of a polymer.

Example 10 A Flocculating and Dehydrating Agent

The aqueous dispersion prepared in Example 4 wes applied to sludge in a municipal sewage treatment facility to test the flocculating and dehydrating effect of the agent.

The test was conducted in the following procedure. 200 ml of sludge was put into a 500 ml beaker and then a predetermined amount of an aqueous solution dissolving the aqueous dispersion prepared in Example 4 to have a polymer concentration of 0.2% was added thereto. The solution was stirred for 20 seconds by means of a stirring rod equipped at the front end with three round sticks with a diameter of 5 mm and a length of 20 mm, which was rotated at a rate of 200 rpm. The flocculated sludge wee filtered with a nylon filter of 60 mesh by gravity filtering and the amount of the filtered water was measured 20 seconds after the filtering operation. Meanwhile, the sludge was held between a pair of 30 cm square polyester monofilament filer cloths, which was then by turn held between a pair of polyvinylchloride panel provided with drain grooves and dressed for 30 seconds in order to remove the water content therefrom by means of a hydraulic press unit having a piston diameter of 20 mm, maintaining a piston pressure of 50 kg/cm$^2$. Finally, the water content of the dehydrated sludge was determined from the weight of the dehydrated sludge and the weight of the solidified sludge after drying it at 120° C. for 3 hours.

An identical test was conducted on samples for comparison. For comparative sample 1, an aqueous dispersion of a cationic water-soluble polymer prepared by the method described in Japanese Patent Application Laid-Open No. 61-123610 (copolymer with a molo ratio of DMABC:DMQ:AAm=30:20:50, 0.5% aqueous salt solution viscosity of 63 cp) was used, while for comparative sample 2, a commercially available powdery amphoteric water-soluble polymer (copolymer with a mole ratio of DMQ:AAc:AAm=50:20:30, 0.5% aqueous salt solution viscosity of 68 cp) was used.

Table 3 summarizes the obtained results.

The amounts of the added polymers are expressed in terms of wt % based on the weight of the solidified sludge.

TABLE 3

| Sample | Filtered Water (ml) | Water Content (%) |
|---|---|---|
| Example 4 | 115 | 78.6 |
| Comparative Sample 1 | 98 | 81.5 |
| Comparative Sample 2 | 103 | 80.7 |

Remarks: Solidified Sludge: 1.8%, Added Polymer: 1.2%

An aqueous dispersion of an amphoteric water-soluble polymer of Example 4 obviously showed an improved flocculating effect and produced solidified sludge with an improved water content when compared with Samples 1 and 2. This may be due to the synergetic effects of the cationic monomer having a benzyl group and the anionic monomer of the polymer of the invention.

Example 11 An Oil Separating Agent

The aqueous dispersions of amphoteric water-soluble polymers prepared in Example 5 and Example 6 were applied to saline water containing oil discharged in a crude oil exploiting operation to test their oil separating effects.

For each test, 1 liter of Arabian crude oil was added to 10 liter of imitated saline water (obtained by adding KCl by 37 mg/liter, Na$_2$SO$_4$ by 50 mg/liter, CaCl$_2$ by 36 mg/liter, MgCl$_2$.6H$_4$O by 50 mg/liter and NaHCO$_1$ by 743 mg/liter to distilled water to regulate the salinity) and the mixture was stirred in a mixer at a rate of 10000 rpm for 10 minutes and was allowed to stand for 1 minutes. The turbid oil-containing water of the lower layer was separated as imitated waste water.

The test was conducted in the following procedure. 500 ml of the imitated waste water was put into a 1000 ml beaker and stirred by means of a jar tester revolving at a rate of 200 rpm. Thereafter, a predetermined amount of an aqueous solution dissolving the aqueous dispersion prepared in Example 5 to have a polymer concentration of 0.1% was added thereto and the mixture was stirred for another 30 seconds, when the rate of revolution was reduced to 50 rpm to see the average particle diameter of the formed flocks. After terminating the stirring operation, the mixture was allowed to stand for five minutes and then a lower portion of the liquid mixture was extracted to measure the turbidity (according to JIS K0101) and the oil content.

Meanwhile, an identical test was conducted on the aqueous dispersion prepared in Example 6 and samples for comparison. For comparative Example 3, an aqueous dispersion of a cationic water-soluble polymer prepared by the method described in Japanese Patent Application Laid-Open No. 61-123610 (copolymer with a mole ratio of DMABC:DMQ:AAm=40:20:40, 0.5% aqueous salt solution viscosity of 60 cp) was used, while for comparative sample 4, a commercially available powdery amphoteric water-soluble polymer (copolymer with a mole ratio of DMQ:AAc:AAm=60:20:20, 0.5% aqueous salt solution viscosity of 48 cp) was used.

Table 4 summarizes the obtained results.

The amounts of the added polymers are expressed in terms of weight based on the volume of the imitated waste water.

TABLE 4

| Sample | Dosage (mg/l) | Flock Size (mm) | Turbidity (degree) | Oil Content (mg/l) |
|---|---|---|---|---|
| not added | — | — | 3820 | 540 |
| Example 5 | 3 | 3.0 | 600 | 93 |
|  | 5 | 4.0 | 470 | 84 |
|  | 7 | 4.0 | 450 | 81 |
| Example 6 | 3 | 3.0 | 620 | 95 |
|  | 5 | 3.5 | 550 | 89 |
|  | 7 | 4.0 | 460 | 85 |
| Comparative Sample 3 | 3 | 1.0 | 1100 | 195 |
|  | 5 | 2.0 | 830 | 158 |
|  | 7 | 2.5 | 720 | 116 |
| Comparative Sample 4 | 3 | 1.0 | 1500 | 270 |
|  | 5 | 1.0 | 1410 | 256 |
|  | 7 | 1.5 | 1290 | 220 |

It is clear that the aqueous dispersions of an amphoteric water-soluble polymers of Example 5 and Example 6 showed improved flocculating and oil separating effects when compared with Comparative Samples 3 and 4. This may be due to the synergetic effects of the cationic monomer having a benzyl group and the anionic monomer of the polymer of the invention.

Example 12 A Drainage Aid

A drainage rest was conducted on paper stuff for the liner of corrugated board (prepared by adding a liquid alum, a sizing agent and a paper strength agent to the recycled pulp of from corrugated board having 420 ml of Canadian Standard Freeness value (hereinafter called "CSF value") by 3%, 0.1% and 0.2% respectively).

The test was conducted in the following procedure. The liner stuff was diluted with white water to a pulp concentration of 0.3% (pH=5.5). Then, 1000 ml of the diluted stuff was put into a 1000 ml measuring cylinder and a predetermined amount of an aqueous solution dissolving the aqueous dispersion prepared in Example 2 to have a polymer concentration of 0.1% was added thereto. Subsequently, the measuring cylinder was turned around three times for mixing and the mixture was then put into a Canadian Standard freeness tester to measure the amount of the drainage coming out of a lateral pipe.

A similar test was also conducted with each of the aqueous dispersions of Examples 3 and 4 and the polymers of Comparative Samples 1 and 2 described earlier.

Table 5 summarizes the test results.

TABLE 5

The Amount of Drainage (CSF value; ml)

| Sample | Dosage of Drainage Aid (based on the weight of pulp) | | |
|---|---|---|---|
| | 100 ppm | 200 ppm | 300 ppm |
| Example 2 | 450 | 510 | 560 |
| Example 3 | 440 | 500 | 550 |
| Example 4 | 445 | 505 | 555 |
| Comparative Sample 1 | 420 | 450 | 480 |
| Comparative Sample 2 | 415 | 430 | 450 |

Remarks: CSF value when no agent was added-390 ml

Example 13 A Drainage Aid

A drainage test was conducted on paper stuff for the corrugating medium of corrugated board (mixed pulp prepared from 90% of recycled pulp from corrugated board and 10% of recycled pulp from newspaper, CSF=400 ml).

The test was conducted in the following procedure. The paper stuff was diluted with white water to a pulp concentration of 1%. Then, 420 ml of the diluted stuff was put into a 1000 ml beaker and a liquid alum and a paper strength agent were added respectively by 3% and 0.2% (based on the weight of pulp) with stirring the pulp solution by means of a stirrer at a rate of 600 rpm. Then, a predetermined amount of an aqueous solution dissolving aqueous dispersion prepared in Example 2 to have a polymer concentration of 0.1% was added thereto. Subsequently, a wet sheet was made on a 40 mesh wire of a TAPPI standard sheet machine at a rate of 100 g/m² of basis weight. The prepared wet paper was set between a pair of felts end dehydrated by means of a test calendar press unit. After the dehydration, the water content of the wet paper sheets was measured.

A similar test was also conducted with each of the aqueous dispersions of Examples 3 and 4 and the polymers of Comparative Samples 1 and 2 described earlier.

Table 6 summarizes the test results.

TABLE 6

Water Content (%)

| Sample | Dosage of Drainage Aid (based on the weight pulp) | | |
|---|---|---|---|
| | 200 ppm | 300 ppm | 400 ppm |
| Example 2 | 64.2 | 63.9 | 63.5 |
| Example 3 | 64.0 | 63.7 | 63.2 |
| Example 4 | 64.1 | 63.8 | 63.4 |
| Comparative Sample 1 | 65.0 | 64.5 | 64.0 |
| Comparative Sample 2 | 65.2 | 64.8 | 64.5 |

Remarks: water content when no agent was added-66.0%

Example 14 A Drainage Aid

A drainage test was conducted on paper stuff for the middle ply of white lined chipboard (mixed pulp prepared from 90% of recycled pulp from corrugated board and 10% of recycled pulp from newspaper, CSF-180 ml).

The test was conducted in the following procedure. The paper stuff wag diluted with white water to a pulp concentration of 0.3%, to which a liquid alum was added by 3% (based on the weight of pulp) to obtain a pH value of 6.80. Thereafter, the steps of Example 12 were followed.

A similar test was also conducted with each of the aqueous dispersions of Examples 3 and 4 and the polymers of Comparative Samples 1 and 2 described earlier.

Table 7 summarizes the test results.

TABLE 7

The Amount of Drainage (CSF value; ml)

| Sample | Dosage of Drainage Aid (based on the weight of pulp) | | |
|---|---|---|---|
| | 100 ppm | 200 ppm | 300 ppm |
| Example 2 | 325 | 365 | 420 |
| Example 3 | 310 | 350 | 405 |
| Example 4 | 320 | 360 | 410 |
| Comparative Sample 1 | 275 | 315 | 370 |
| Comparative Sample 2 | 260 | 300 | 350 |

Remarks: CSF value when no agent was added = 150 ml

Example 15 A Retention Aid

A retention test was conducted on paper stuff of stock inlet for an acidic mechanical woodpulp paper (GP=40%, DIP=45%, BKP=15%, pH=4.80, SS=7967 ppm, ash content=727 ppm) means of a Britt-type dynamic jar tester.

The test was conducted in the following procedure. 500 ml of the paper stuff of stock inlet wes put into a Britt-type dynamic jar tester. Then, a predetermined amount of an aqueous solution dissolving the aqueous dispersion prepared in Example 2 to have a polymer concentration of 0.1% was added to the paper stuff of stock inlet as a retention aid with stirring the inlet material at a rate of 1500 rpm. 30 seconds after the addition of the retention aid, the white water sampling cock was opened to allow white water to flow through a wire (200 mesh). The white water was thrown away for the initial 10 seconds and then collected for the succeeding 30 seconds and the SS concentration and the ash content of the collected white water were measured.

A similar test was conducted on samples. For comparative sample 5, an aqueous dispersion of a cationic water-soluble polymer prepared by the method described in Japanese Patent Application Laid-Open NO. 61-123510 (copolymer with a mole ratio of DMABC:DMQ:AAm=20:10:70, 0.5% aqueous salt solution viscosity of 58 cp) was used, while for comparative sample 6, a commercially available powdery amphoteric water-soluble polymer (copolymer with a mole ratio DMQ:AAc:AAm=30:10:60, 0.5% aqueous salt solution viscosity of 62 cp) was used.

Tables 8 and 9 summarily show the obtained results.

The retention ratio was calculated by the following equations.

$$\text{Total One Pass Retention} = \frac{(SS \text{ of stuff inlet}) - (SS \text{ of white water})}{(SS \text{ of stuff inlet})} \times 100(\%)$$

$$\text{Filler One Pass Retention} = \frac{(\text{ash content of stuff inlet}) - (\text{ash content of white water})}{(\text{ash content of stuff inlet})} \times 100(\%)$$

TABLE 8

Total One Pass Retention (%)

| Sample | Dosage of Drainage Aid (based on the weight of pulp) | | |
|---|---|---|---|
| | 100 ppm | 200 ppm | 300 ppm |
| Example 2 | 60.0 | 65.3 | 66.9 |
| Comparative Sample 5 | 58.9 | 60.6 | 62.3 |
| Comparative Sample 6 | 58.4 | 59.6 | 61.8 |

Remarks: Total Retention when no agent was added = 52.8%

TABLE 9

Filler One Pass Retention (%)

| Sample | Dosage of Drainage Aid (based on the weight of pulp) | | |
|---|---|---|---|
| | 100 ppm | 200 ppm | 300 ppm |
| Example 2 | 20.1 | 26.6 | 32.0 |
| Comparative Sample 5 | 16.6 | 18.1 | 23.0 |
| Comparative Sample 6 | 15.5 | 16.2 | 19.8 |

Remarks: Filler Retention when no agent was added = 8.8%

Example 16 A Retention Aid

A retention test using a Britt-type dynamic jar tester was conducted on paper stuff of stock inlet for a neutral paper (pulp LBKP, CSF-400 ml, calcium carbonate, a liquid alum, cationic starch and a neutral sizing agent were added respectively by 13%, 0.5%, 0.5% and 0.5% based on the weight of pulp, pH=7.70, SS=9200 ppm, ash content=1265 ppm), to which a predetermined amount of an aqueous solution dissolving the aqueous dispersion prepared in Example 1 to have a polymer concentration of 0.1% wes added as in the case of Example 15.

A similar test was conducted on samples. For comparative sample 7, aqueous dispersion of a cationic water-soluble polymer prepared by the method described in Japanese Patent Application Laid-Open No. 61-123610 (copolymer with a mole ratio of DMABC:AAm=10:90, 0.5% aqueous salt solution viscosity of 55 cp) was used, while for comparative sample 8, a commercially available powdery amphoteric water-soluble polymer (copolymer with a mole ratio of DMQ:AAc:AAm=10:5:85, 0.5% aqueous salt solution viscosity of 58 cp) was used.

Tables 10 and 11 summarily show the obtained results. The retention ratio was calculated by the above equations.

TABLE 10

Total One Pass Retention (%)

| Sample | Dosage of Drainage Aid (based on the weight of pulp) | | |
|---|---|---|---|
| | 100 ppm | 200 ppm | 300 ppm |
| Example 1 | 76.2 | 78.2 | 82.2 |
| Comparative Sample 7 | 72.5 | 75.5 | 78.2 |
| Comparative Sample 8 | 72.0 | 75.2 | 78.0 |

Remarks: Total Retention when no agent was added = 68.5%

TABLE 11

Filler One Pass Retention (%)

| Sample | Dosage of Drainage Aid (based on the weight of pulp) | | |
|---|---|---|---|
| | 100 ppm | 150 ppm | 200 ppm |
| Example 1 | 33.5 | 40.0 | 45.2 |
| Comparative Sample 7 | 25.8 | 31.2 | 34.6 |
| Comparative Sample 8 | 25.0 | 29.4 | 33.2 |

Remarks: Filler Retention when no agent was added = 18.0%

Example 17 A Chemical for Recovering Valuable Substances from White Water

A flocculating effect test was conducted on white paper in a papermaking process for manufacturing acidic chemicalpulp paper (pH=5.70, SS=1680 mg/liter) by means of a jar tester.

The test was conducted in the following procedure. 500 ml of white water was put into a 100 ml beaker and stirred at a rate of 200 rpm by means of a jar tester. Then, a predetermined amount of an aqueous solution dissolving the aqueous dispersion prepared in Example 2 to have a polymer concentration of 0.1% was added thereto and the mixture was stirred for another 30 seconds. Then, the rate of revolution was reduced to 100 rpm and stirred for 30 seconds. Thereafter, the rate of revolution was further reduced to 50 rpm and stirred for 50 seconds before the operation of the jar tester was stopped. After terminating the stirring operation, the mixture was allowed to stand for one minute and then a 200 ml of the supernatant was extracted to measure the SS of the solution. Additionally, the average flock size and the setting velocity of the flock were observed after the agitation.

A similar test was conducted on each of Comparative Samples 5 and 6.

Table 12 summarized the test results. The amounts of the polymer added to white water are based on the volume of white water.

TABLE 12

| Sample | Dosage (mg/l) | Flock Size (mm) | Supernatant SS (mg/l) | Setting Velocity (visual observation) |
|---|---|---|---|---|
| Example 2 | 0.5 | 2.0 | 25 | slightly bad |
| | 1.0 | 4.5 | 12 | good |
| | 2.0 | 7.0 | 3 | excellent |
| Comparative | 0.5 | 0.5 | 88 | very bad |

TABLE 12-continued

| Sample | Dosage (mg/l) | Flock Size (mm) | Supernatant SS (mg/l) | Setting Velocity (visual observation) |
|---|---|---|---|---|
| Sample 5 | 1.0 | 1.5 | 43 | slightly bad |
|  | 2.0 | 3.0 | 18 | good |
| Comparative Sample 6 | 0.5 | 0.5 | 72 | very bad |
|  | 1.0 | 2.0 | 38 | slightly bad |
|  | 2.0 | 3.5 | 15 | good |

Example 18 A Chemical for Recovering Valuable Substances from White Water

A flocculating effect test was conducted on white paper in a papermaking process for manufacturing neutral paper for plain paper copy (pH=7.20, SS=1960 mg./liter) by means of a 3 jar tester, using the aqueous dispersion of Example 1 and Comparative Samples 7 and 8 described above as in the case of Example 17.

Table 13 summarized the test results.

TABLE 13

| Sample | Dosage (mg/l) | Flock Size (mm) | Supernatant SS (mg/l) | Setting Velocity (visual observation) |
|---|---|---|---|---|
| Example 1 | 1.0 | 5.0 | 8 | good |
| Comparative Sample 7 | 1.0 | 2.0 | 35 | slightly bad |
| Comparative Sample 8 | 1.0 | 1.5 | 68 | slightly bad |

Since an aqueous dispersion of an amphoteric water-soluble polymer according to the invention is obtained by polymerizing a mixture of monomers comprising a specific cationic monomer and an anionic monomer as essential components with stirring in an aqueous salt solution incapable of dissolving the produced polymer and in the presence of a polymer electrolyte diapersant soluble in said aqueous salt solution, it is stably storable, easily flowable and good for handling when the concentration of the produced amphoteric water-soluble polymer in the aqueous dispersion, the concentration of the salt, the concentration of the dispersant, the viscosity of the aqueous dispersion, and the average diameter of the particles of the amphoteric water-soluble polymer in the aqueous dispersion are respectively found within specific ranges.

An aqueous dispersion of an amphoteric water-soluble polymer according to the invention can be easily manufactured by means of an appropriate known apparatus. Additionally, it can resolve the problems of any existing comparable aqueous dispersions in terms of the use of organic solvent, the need of heating and drying and the high cost of transportation due to a low concentration.

Since an aqueous dispersion of an amphoteric water-soluble polymer according to the invention comprises fine particles with a small particle diameter to make it lowly viscous, easily flowable and quickly soluble, applications of the polymerization product of the present invention include a chemical to be added to raw sludge, excess sludge, digested sludge or any mixtures thereof derived from municipal sewage, human waste or general industrial waste water in the process of flocculating such sludges, a chemical to be added to such sludges for flocculating and/or dehydrating them before processing at a decanter, belt press, filter press or screw press dehydrators, an oil separating agent to be used in an oil separating process for separating and treating oil from oil-containing industrial waste water, a drainage aid to be used in a papermaking process, a retention aid to be used in a papermaking process and a chemical to be used for recovering valuable substances from white water in the papermaking process. Additionally, it can effectively be used for automatically dissolving systems of a variety of industrial facilities or it can greatly contribute to automatization of various facilities. Additionally, since an aqueous dispersion of a polymer according to the invention has an excellent solubility, it can be directly added to waste water, sludge or papermaking processes. Still additionally, since an aqueous dispersion of an amphoteric water-soluble polymer according to the invention is a copolymer comprising a cationic monomer expressed by the general formula (I) shown above and an appropriate anionic monomer within each molecule, it shows an excellent flocculating effect if compared with conventional cationic and amphoteric water-soluble polymers because of the particular synergetic effects of the polymer. It also shows a strong affinity to oils. Therefore, an aqueous dispersion of an amphoteric water-soluble polymer according to the invention can be effectively utilized in various sectors of industry.

What is claimed is:

1. An aqueous dispersion of an amphoteric water-soluble polymer polymerization product of a mixture of monomers comprising a cationic monomer expressed by the formula (I),

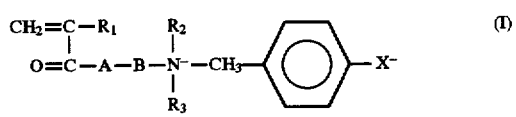

, where A is O or NH; B is an alkyl group of 2~3 carbon atoms; $R_1$ is H or $CH_3$; $R_2$ and $R_3$ are each an alkyl group of 1–2 carbon atoms; $X^-$ is an anionic counter ion, and an anionic monomer as essential components in an aqueous salt solution incapable of dissolving the polymer and in the presence of a polymer electrolyte dispersant soluble in said aqueous salt solution, said aqueous dispersion having characteristic properties which are that (1) the concentration of the amphoteric water-soluble polymer in the aqueous dispersion is 5 wt % or more, than (2) the average particle diameter of the particle of the amphoteric water-soluble polymer in the aqueous dispersion is 0.1~150 μm, that (3) the viscosity of the aqueous dispersion is 10–3000 cp, that (4) the concentration of the salt in the aqueous dispersion is 15 wt %-saturation concentration, and that (5) the concentration of the dispersant in the aqueous dispersion based on the amphoteric water-soluble polymer is 1–15 wt %.

2. An aqueous dispersion of an amphoteric water-soluble polymer according to claim 1, wherein said mixture of monomers comprises monomer of said formula (I) monomer of the formula (II),

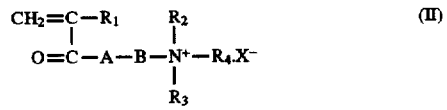

, where A is O or NH; B is an alkyl group of 2~3 carbon atoms; $R_1$ is H or $CH_3$; $R_2$ and $R_3$ are each an alkyl group of 1–2 carbon atoms; $R_4$ is an alkyl group of 1–2 carbon atoms; $X^-$ is an anionic counter ion; (meth)acrylamide and an anionic monomer.

3. An aqueous dispersion of an amphoteric water-soluble polymer according to claim 1 or, wherein said anionic monomer comprises a monomer selected from the group consisting of itaconic acid, (math)acrylic anionic monomer and a mixture thereof.

4. An aqueous dispersion of an amphoteric water-soluble polymer according to claim 3, wherein said anionic monomer is itaconic acid.

5. An aqueous dispersion of an amphoteric water-soluble polymer according to claim 3, wherein said anionic monomer is a (meth)acrylic anionic monomer.

6. An aqueous dispersion of an amphoteric water-soluble polymer according to claim 5, wherein said (meth)acrylic anionic monomer is a monomer selected from the group consisting of (meth)acrylic acid, 2-acrylamide-2-methylpropane sulfonic acid and a mixture thereof.

7. An aqueous dispersion of an amphoteric water-soluble polymer according to claim 1, wherein the total gram equivalent value of said cationic monomer(s) in said amphoteric water-soluble polymer is greater than the total gram equivalent value of said anionic monomer(s) in said amphoteric water-soluble polymer.

8. An aqueous dispersion of an amphomeric water-soluble polymer according to claim 2, wherein said cationic monomer expressed by the formula (II) is acryloyloxyethyltrimethylammonium salt.

9. An aqueous dispersion of an amphoteric water-soluble polymer according to claim 1, wherein said cationic monomer expressed by the formula (I) is acryloyloxyethyldimethylbenzyl ammonium salt.

10. An aqueous dispersion of an amphoteric water-soluble polymer according to claim 1, wherein said diapersant is one or more than one cationic polymer electrolytes.

11. An aqueous dispersion of an amphoteric water-soluble polymer according to claim 1, wherein said dispersant is a (co)polymer of one or more than one monomer selected from the group consisting of dimethylaminoethyl(meth)acrylate chloride or sulfate, dimethylaminopropyl(meth)acrylamide chloride or sulfate, (meth)acryloyloxyethyltrimethylammonium chloride, (meth)acrylamidepropyltrimethylammonium chloride, dimethyldiarylammonium chloride in a mole ratio of 50 mole % to 100 mole %, and acrylamide in a mole ratio of 50 mole % to 0 mole %.

12. A method of manufacturing a stably storable and easily flowable aqueous dispersion of an amphoteric water-soluble polymer, characterized in polymerizing a mixture of monomers comprising a cationic monomer expressed by the formula (I),

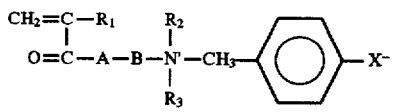  (I)

, where A is O or NH; B is an alkyl group of 2–3 carbon atoms; $R_1$ is H or $CH_3$; $R_2$ and $R_3$ are each an alkyl group of 1–2 carbon atoms; $X^-$ is an anionic counter ion, and an anionic monomer as essential components with stirring in an aqueous salt solution incapable of dissolving the produced polymer and in the presence of a polymer electrolyte dispersant soluble in said aqueous salt solution.

13. A method of manufacturing an aqueous dispersion of an amphoteric water-soluble polymer according to claim 12, characterized by polymerization of a mixture of monomers comprising anionic monomers expressed by said formula (I) and the formula (II),

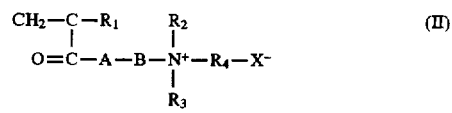  (II)

, where A is O or NH; B is an alkyl group of 2–3 carbon atoms; $R_1$ is H or $CH_3$; $R_2$ and $R_3$ are each an alkyl group of 1–2 carbon atoms; $R_4$ is an alkyl group of 1–2 carbon atoms; $X^-$ is an anionic counter ion, (meth)acrylamide and an anionic monomer as essential components.

14. A method of manufacturing an aqueous dispersion of an amphoteric water-soluble polymer according to claim 12, wherein a further amount of salt is added to the aqueous dispersion of an amphoteric water-soluble polymer obtained by polymerization.

15. A flocculating agent to be used in the treatment of municipal sewage, human waste, general industrial waste water or other waste water, said agent comprising an aqueous dispersion of an amphoteric water-soluble polymer according to claim 1.

16. A flocculating and/or dehydrating agent to be used in the treatment of municipal sewage, human waste, general industrial waste water or other waste water before processing at a decanter, belt press, filter press or screw press dehydrators, said agent comprising an aqueous dispersion an amphoteric water-soluble polymer according to claim 1.

17. An oil separating agent to be used in the process of separating oil from oil-containing industrial waste water, said agent comprising an aqueous dispersion of an amphoteric water-soluble polymer according to any of claim 1.

18. A drainage aid to be used for producing paper from pulp stuff in a papermaking process, said agent comprising an aqueous dispersion of an amphoteric water-soluble polymer according to claim 1.

19. A retention aid for retaining additives to paper in the papermaking process for producing paper, said agent comprising an aqueous dispersion of an amphoteric water-soluble polymer according to claim 1.

20. A chemical composition for recovering useful and valuable substances from white water discharged in the papermaking process, said agent comprising an aqueous dispersion of an amphoteric water-soluble polymer according to claim 1.

* * * * *